Aug. 12, 1947.   C. C. SMITH   2,425,649
PACKING RING
Filed Oct. 31, 1944   2 Sheets-Sheet 1

By: Fred Gerlach his Atty   Inventor Charles C. Smith

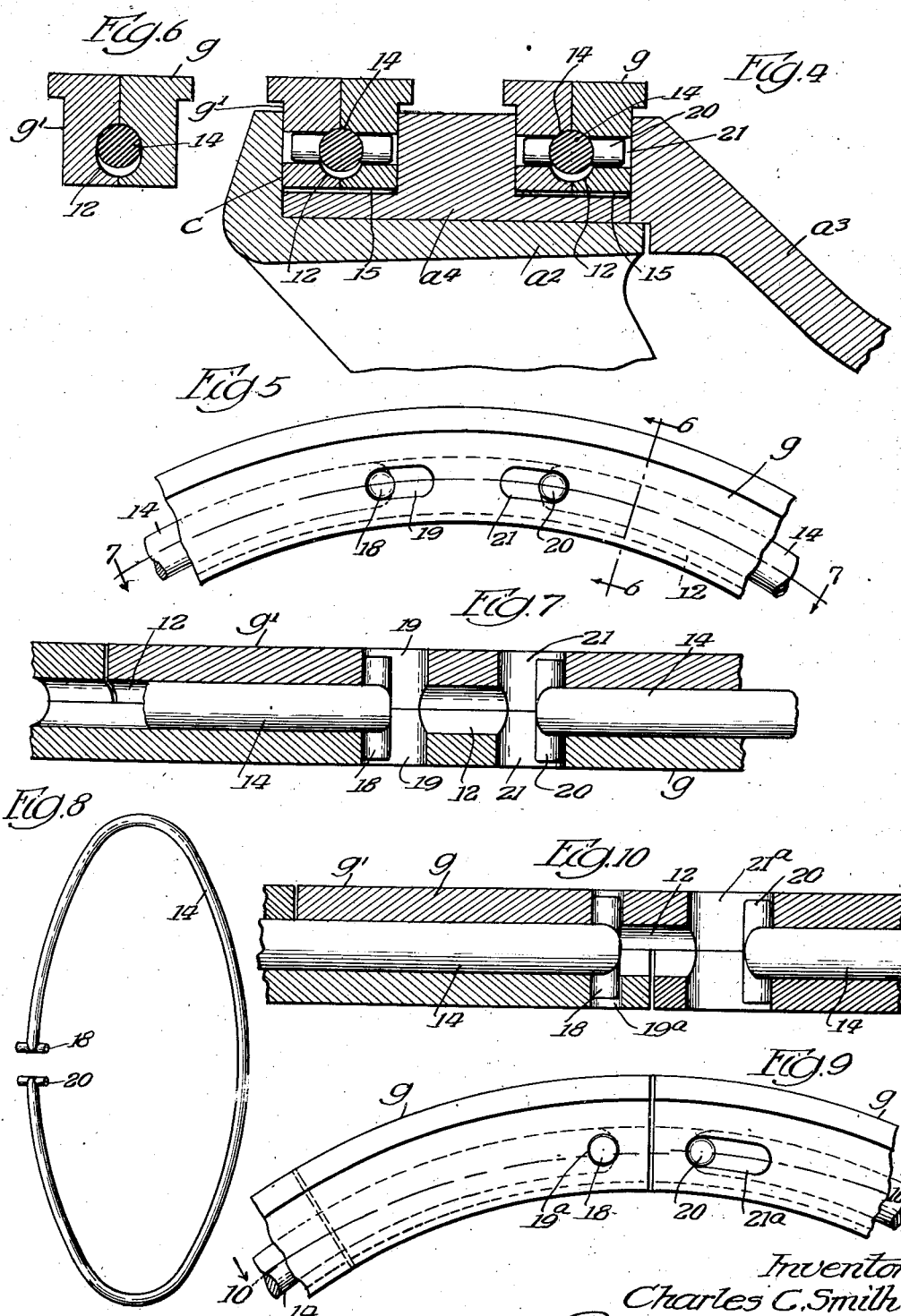

Patented Aug. 12, 1947

2,425,649

UNITED STATES PATENT OFFICE 2,425,649

PACKING RING

Charles C. Smith, Atchison, Kans., assignor to The Locomotive Finished Material Company, Atchison, Kans., a corporation of Kansas Application October 31, 1944, Serial No. 561,183

2 Claims. (Cl. 309—29)

1

The invention relates to packing-rings for pistons.

In packing-rings of the type which comprises annuli mounted in an annular channel in the piston and formed of segments radially shiftable in the channel, and a transversely split resilient or spring ring for spreading the segments, it has been found that the maximum expansion of the ring varies from lack of accuracy in fabrication or service under superheated steam conditions. When such expansion of the resilient ring varies and it is not postively and predeterminately limited and the packing-rings are used in piston-valves which require endwise insertion into the valve cylinders, it is difficult to slide the piston or piston-valves into the cylinders.

One object of the invention is to provide a packing-ring of this type with connections between the segments and the resilient ring which positively limit to a predetermined maximum the spreading of the segments of the annuli by the spring-ring, so as to prevent excessive expansion of the annuli or spreading of the segments while inserting or removing the piston-valve from its seat or when the ring is fabricated or its expanding face is changed so it will exert undesirable expanding pressure against the segments.

Another object of the invention is to provide a packing-ring of this type with stud-and-slot connections between the resilient ring and the segments of the annuli for positively limiting the expansion of the annuli and the ring.

Other objects of the invention will appear from the detailed description.

The invention consists in the the several novel features hereinafter set forth and more particularly defined by claims at the conclusion hereof.

Fig. 4 is a section taken on line 4—4 of Fig. 3 on an enlarged scale.

2

Fig. 5 is a side elevation of a portion of one of the packing-rings.

Fig. 6 is a section taken on line 6—6 of Fig. 5.

Fig. 7 is a section taken on line 7—7 of Fig. 5.

Fig. 8 is a perspective of the split expander ring.

Fig. 9 is a side elevation of a packing-ring embodying a modified form of the invention.

Fig. 10 is a section taken on line 10—10 of Fig. 9.

The invention is exemplified in a piston $a$ operatively connected to a stem $a'$ and provided at each of its ends with a head $a^2$ which carries a pair of packing-rings adapted to fit and slide in the valve-bushings or cylinders $b$, respectively, of a steam valve $f$ of usual construction. The heads $a^2$ are fixedly secured to the piston stem with a hollow central spacer section $a^3$ between them. A ring $a^4$ is seated in each head between its outer end and the section $a^3$. Annular straight sided channels $c$ for a pair of packing-rings are formed in the sides of ring $a^4$ and between said ring and the outer side of heads $a^2$ and the outer ends of section $a^3$, respectively. This exemplifies a valve-piston provided at each end with annular channels for a pair of packing-rings for operation in the cylinders $b$, which are provided with inlet and exhaust ports, as well understood in the art. The packing-rings are alike in construction.

Each packing-ring comprises a pair of annuli and each annulus comprises a series of segments or segmental sections $g$ which are radially slidable in a channel $c$. The segments $g$ have outer side faces $g'$ which slidably fit one side of a channel $c$. The segments of each pair of annuli have abutting or contiguous slidably fitting inner faces. An annular groove 12 is formed in the contiguous faces or between the segments $g$ of each pair of annuli. A transversely split resilient or spring ring 14 extends circumferentially around and is confined in the groove 12 between the segments of a pair of annuli. The outer peripheral portion of the ring 14 engages the outer portion of the groove 12 and exerts radially outward or spreading pressure on the segments of both annuli. The inner peripheral portion of groove 12 is contoured to provide clearance between the inner peripheral portion of the ring 14 and the segments. Clearance is also provided at 15 between the inner peripheral faces of the segments $g$ and the bottom of the channel $c$. The segments

*g* in one annulus are staggered relatively to the segments in the other annulus. The segments may be formed of different metals or of the same metal.

Figure 1:
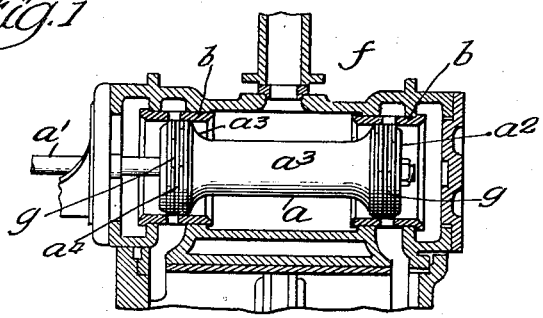
Fig. 1 is a section of a valve-cylinder with a valve piston therein shown in elevation.
Figure 2:
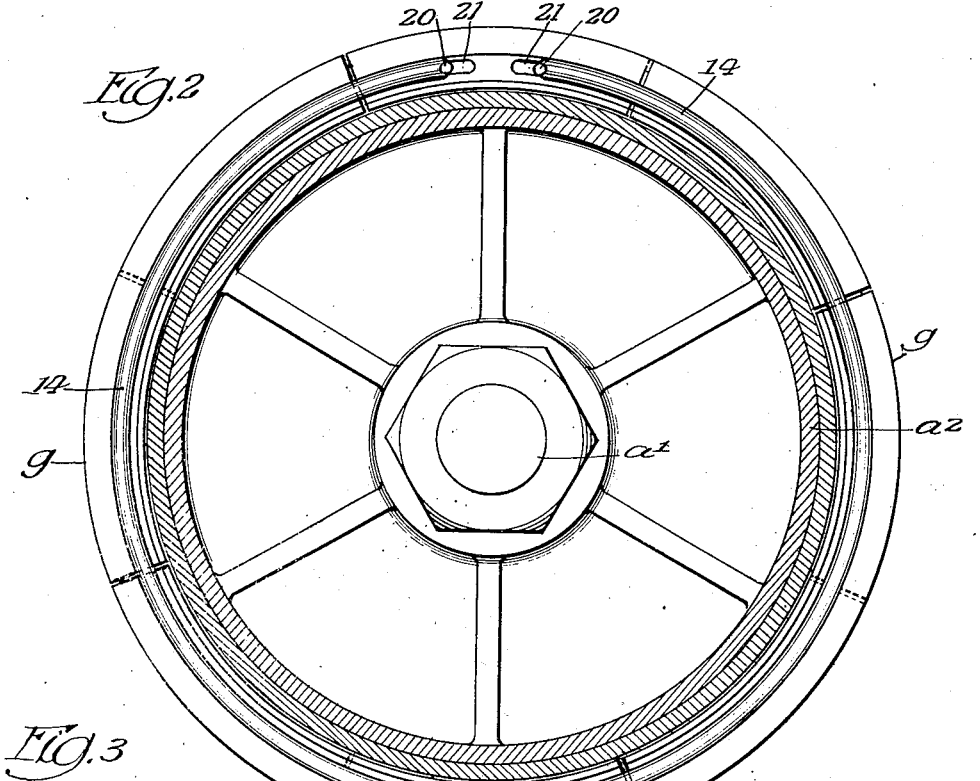
Fig. 2 is a transverse section of a packing-ring and piston embodying the invention, the section being taken on a line between the annuli of one of the packing-rings.
Figure 3:
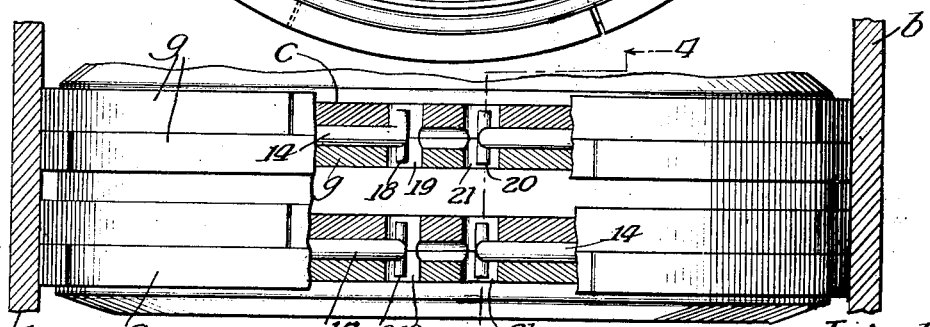
Fig. 3 is a plan of an end-portion of the valve-piston and a pair of packing-rings, the packing-rings being shown partially contracted by the cylinder.

One end of the transversely split resilient ring 14 has secured thereto, as by welding, a stud or dowel 18 and its other end has secured thereto a stud or dowel 20. Both of said studs project from opposite sides of said ring. One end of stud or dowel 18 extends into a slot 19 in one of the segments *g* at one side of ring 14 and the opposite end of said stud or dowel extends into an aligned slot 19 in one of the segments *g* of the other annulus. The stud or dowel 20 also projects from opposite sides of ring 14 and its ends extend into a slot 21 formed in the segment of one annulus, and its opposite end extends into a similar slot 21 into the contiguous segment of the other annulus. Slots 19 and 21 are of limited length to positively limit the expansion of ring 14 to a predetermined maximum diameter and correspondingly limit the spreading of the segments of both annuli when the packing-ring is not confined in a cylinder *b* in which the piston is slidable. The ends of the studs 18 and 20 at one side of ring 14, at least are connected by slots 19 and 21 to the same segment so that the expansion of the ring 14 will be positively limited by the limited movement permitted by the slots 19 and 21. In the construction shown in Figs. 2, 4 and 6, the studs at each side of ring 14 extend into slots in the same segment. By providing dowels extending into segments of both annuli the spread of the segments of each annulus is limited and the segments are limited circumferentially so that the segments in one annulus will not pass out of staggered relation with those in the other.

When the piston is not confined in its cylinder *b*, the resilient ring 14 will be free to spread the segments *g* of both annuli until the studs 18 and 20 engage the outer ends of slots 19 and 21 which limit the expansion of ring 14. The packing-rings are assembled with the piston before the piston is inserted into the cylinder. At this time the maximum radial spread of the segments will be positively limited by the stud-and-slot connections between the ends of said ring and the segments of each of the annuli so that the maximum diameter of the packing-ring may be kept within a predetermined limit which will facilitate the placement of the piston *a* endwise into the cylinders *b*.

In assembling the valve-piston *a* with the cylinders *b* it is necessary to successively force one of the piston heads $a^2$ through the cylinder *b* at one end of the valve and into the cylinder *b* at the other end of the valve and to force the other piston with its packing-ring into the first mentioned cylinder. This presents difficulties in assembly which are overcome by predeterminately limiting the spread of the segments of the annuli in the packing-rings while retaining sufficient expanding force in the ring for the operation of the piston-valve in the cylinders. In practice it has been found that variation in the fabrication of the expander rings in many instances causes excessive radial spreading which renders the assembly of the piston with the cylinders difficult. When the piston is in the cylinders *b*, the expander rings 14 will be more or less contracted and will press the segments *g* into contact with the inner periphery of the cylinders. The slots 19 and 21 permit contraction of the ring 14 so that said ring will keep the segments pressed against the inner periphery of the cylinders.

In the modification illustrated in Figs. 9 and 10, the resilient ring 14 is provided with studs 18 and 20 projecting from opposite sides and at its ends, respectively. The ends of stud 18 are confined in holes 19ª in contiguous segments *g* in the annuli and the ends of stud 20 extend into slots 21ª formed in the contiguous segments *g* in the annuli. In this construction, one of end of the expander ring 14 has no sliding connection with contiguous segments and has its studs extending into slots in contiguous segments of the annuli of sufficient length to permit the desired contraction and to predeterminately limit the expansion of the expander ring 14. In this construction the ends of the studs 18 and 20 are connected to same segment in one annulus and to adjacent segments in the other annulus. It is of importance that the studs at one side of ring 14 extend into the same segment to limit the expansion of the ring 14 and the radial spreading of the segments in both annuli thereby.

The invention exemplifies a packing-ring for pistons or piston-valves which comprises an annulus or annuli mounted in a channel in the piston for movement in a radial direction and formed of segments having contiguous side-faces and a transversely split resilient expander ring and connections between the expander ring and the segments which positively and predeterminately limit the expansion of the resilient ring and the radial spreading of the segments, for facilitating the insertion of the piston in its cylinders, notwithstanding variations in the resiliency of the ring. This connecting-means is simple in construction and efficient in operation.

The invention is not to be understood as restricted to the details set forth, since these may be modified within the scope of the appended claims without departing from the spirit and scope of the invention.

Having thus described the invention, what I claim as new and desire to secure by Letters Patent is:

1. The combination with a piston provided with an annular channel in its outer periphery, of a packing ring comprising two annuli mounted in the channel for movement relatively to each other in a radial direction and formed of segments having contiguous side faces and mating grooves in said side faces, a transversely split resilient ring disposed in the grooves in said side faces, abutting the segments in both annuli for radial expansion, having sufficient inherent expansive force for radially spreading the segments of both annuli against the cylinder-wall and a projection on each end of the resilient ring extending into a segment in each annulus, and means in at least one of said last named sections in which one of the projections is slidable for normally permitting relative movement between the ends of the resilient ring for expansion of the segments by the inherent resiliency of said ring and contraction of the segments by the cylinder-wall and for predeterminately limiting the ultimate expansion of the segments by the resilient ring.

2. The combination with a piston provided with an annular channel in its outer periphery, of a packing ring comprising two annuli mounted in the channel for movement relatively to each other in a radial direction and formed of segments having contiguous side faces and mating grooves in said side faces, a transversely split resilient ring disposed in the grooves in said side faces, abutting the segments in both annuli for radial expansion, having sufficient inherent expansive force for radially spreading the segments of both annuli against the cylinder-wall and a projection on each end of the resilient ring extending into a segment in each annulus, and means in each of said last named sections in which the projections are respectively slidable for permitting relative movement between the ends of the resilient ring for expansion of the segments by the inherent resiliency of said ring and contraction of the segments by the cylinder-wall and for predeterminately limiting the ultimate expansion of the segments by the resilient ring.

CHARLES C. SMITH.

REFERENCES CITED

The following references are of record in the file of this patent:

UNITED STATES PATENTS

| Number | Name | Date |
| --- | --- | --- |
| 1,572,443 | Muchnic | Feb. 9, 1926 |
| 2,107,301 | Koether | Feb. 8, 1938 |